S. S. GOSSARD & J. E. CRANDALL.
HEADLIGHT CONTROL.
APPLICATION FILED APR. 9, 1917.
1,271,566.
Patented July 9, 1918.
2 SHEETS—SHEET 1.
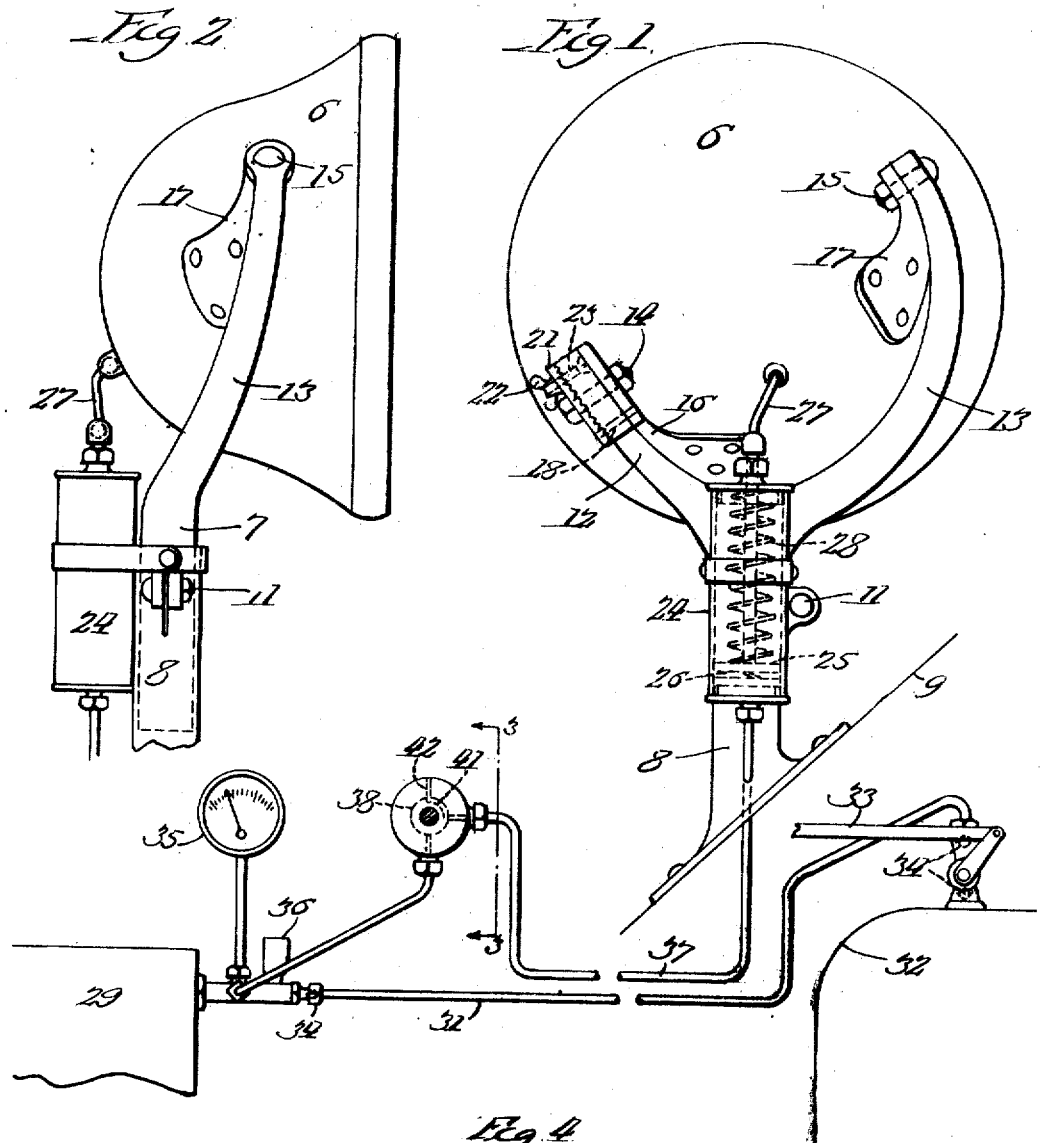
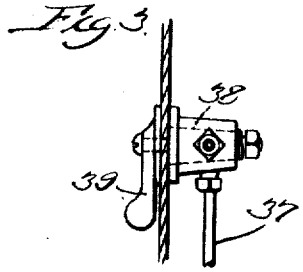
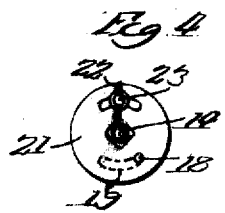
INVENTOR.
Samuel S. Gossard
Jay E. Crandall
BY
Pond & Wilson
ATTORNEYS

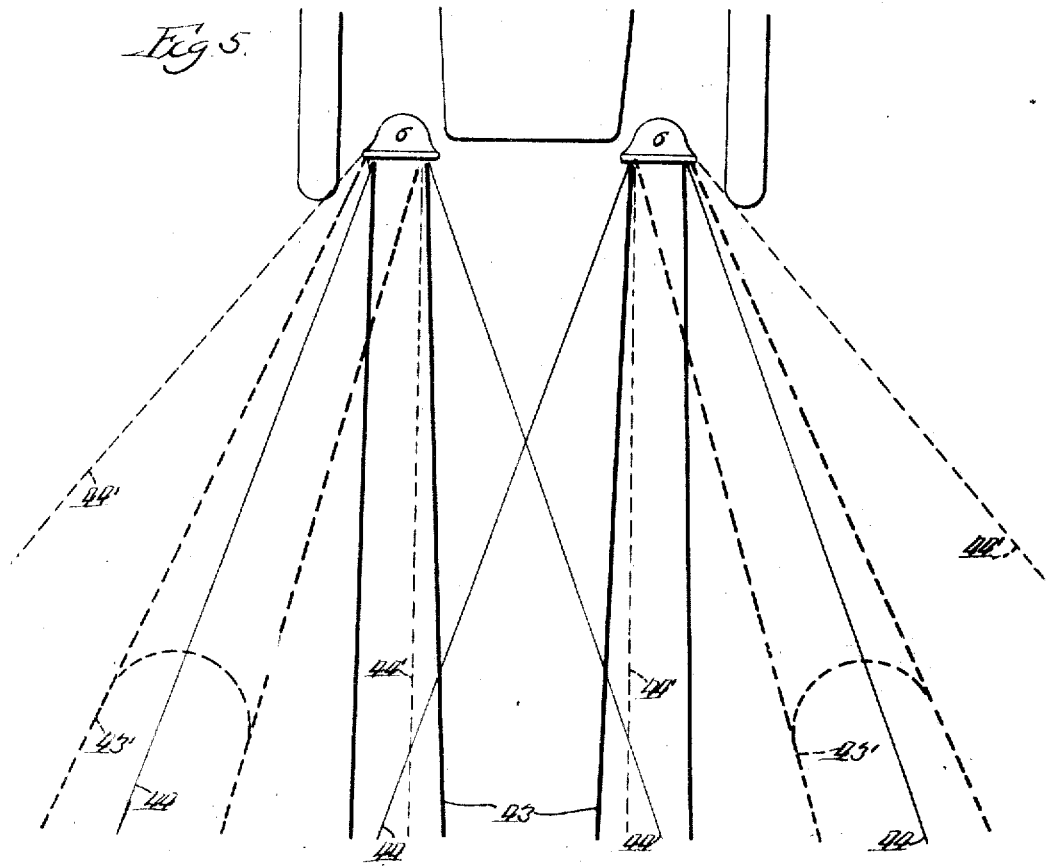
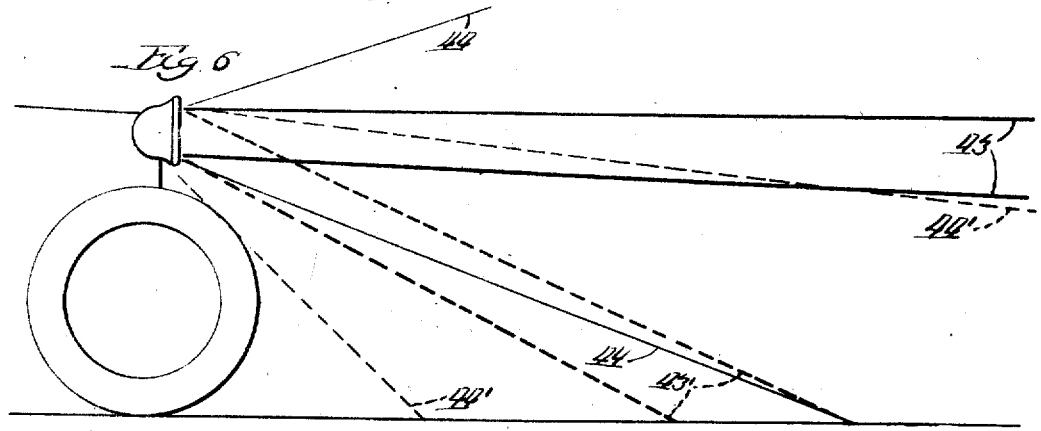

UNITED STATES PATENT OFFICE.

SAMUEL S. GOSSARD AND JAY E. CRANDALL, OF BELVIDERE, ILLINOIS.

HEADLIGHT CONTROL.

1,271,566.  Specification of Letters Patent.  Patented July 9, 1918.

Application filed April 9, 1917. Serial No. 160,732

*To all whom it may concern:*

Be it known that we, SAMUEL S. GOSSARD and JAY E. CRANDALL, citizens of the United States, residing at Belvidere, in the county of Boone and State of Illinois, have invented certain new and useful Improvements in Headlight Controls, of which the following is a specification.

This invention pertains to headlight illuminating means especially adapted for motor vehicles, and has more particular reference to the control of the headlight rays for the purpose of so diverting or deflecting them that they will not confuse other users of the highway. The problem of the glary bright headlight has been treated in various ways, as for example, by dimming, deflecting and diffusing the rays; but it is found that while the means heretofore employed have in a way avoided the glare they do not give adequate and proper illumination of the road bed immediately about the front of the vehicle when desired so that the driver may be properly guided under all circumstances.

In our present invention, we have aimed, primarily, to provide a headlight illuminating means of an improved character, whereby the road bed may be fully illuminated ahead by the intensified rays when conditions will permit and whereby these rays may, at will, be directed downwardly and outwardly so as to fully illuminate that portion of the road bed immediately in front and at each side of the vehicle. In other words, in the latter instance the intensified rays while being directed downwardly are also directed outwardly or sidewise beyond each side of the vehicle. As a consequence, the road bed is fully illuminated in front of the vehicle and at both sides thereof so that the edges of the road bed which may be flanked by a ditch, gutter or curbing will be plainly and fully illuminated to thereby enable the driver to easily and safely guide the vehicle, especially when turning to the right or left. At the same time, the intensified rays have been so deflected as not to dazzle or confuse other users of the highway.

In furtherance of this general object we have devised an improved headlight mounting and control mechanism for moving the headlights to deflect their rays in the manner described. By means of these improvements, an occupant of a vehicle may, at will, cause the headlights which are mounted to oscillate on inclined axes, to be swung from a substantially straight-ahead position to a downwardly and outwardly directed position, and vice versa, for the purposes specified above.

Our invention also contemplates the provision of a headlight control means of the character described which is of simple construction and will practically and effectually serve the purposes desired.

Other objects and attendant advantages will be more readily appreciated as the invention becomes better understood by reference to the following description when considered in connection with the accompanying drawings, in which—

Figure 1 is a rear elevation of a headlight mounting embodying our improvements and showing diagrammatically the piping arrangement of the fluid control for tilting the headlights;

Fig. 2 is a side elevation of the headlight shown in Fig. 1;

Fig. 3 is a detail sectional view taken substantially on the line 3—3 of Fig. 1;

Fig. 4 is a face view of one of the bracket arm connections embodying an adjustment for limiting the tilting movement of the headlight; and Figs. 5 and 6 are diagrammatic views, respectively in plan and side elevation, illustrating the direction of the light rays in the straight-ahead and tilted or diverted positions.

In this invention, we have designed to provide a motor vehicle headlight illuminating means so constructed that the intensified rays may be diverted at will from substantially straight-ahead to downwardly and outwardly directed paths. By intensified rays, we mean those produced by parabolic reflectors in the headlights for the purpose of giving a defined strong and intensified central shaft of light surrounded by diffused light rays. Such a type of head light is now universally considered as standard equipment for motor cars. As these headlights are ordinarily used, the intense rays are directed substantially straight ahead, although slightly turned inwardly and a trifle downwardly so as to center or focus on the road bed a considerable distance, such as from 75 to 300 feet in advance of the vehicle, while the diffused rays, illuminate to a less extent the road bed in front of the vehicle but not very close thereto. As these rays directed substantially straight ahead are objectionable and at time a source of danger, means have been employed for diffusing the rays, dimming them and deflecting them downwardly at will; but in all instances, after the rays have been thus dimmed, diffused, or deflected they do not illuminate the road bed as fully as is desirable to permit the driver to safely operate the vehicle under all conditions and circumstances. Our invention contemplates, therefore, as prefaced above, the control of these straight-ahead intensified rays in such novel manner as to thoroughly insure safety to both the driver and other users of the highway. This is accomplished by directing the intensified rays downwardly and outwardly or sidewise so that the intensified rays strike the road bed in proximity to the vehicle and beyond each side of the same. Thus, a considerably wider expanse of road bed is intensely illuminated than when the rays are directed straight ahead, and the driver has full view of the road bed at both sides of the car so that he may properly guide the car with respect to the curbing, ditches or gutters bordering the road bed and may also be fully guided when turning the car to the right or left. This idea we believe to be broadly novel and, therefore, it should be understood that the invention is in no way limited to the particular construction of the means by which the object is attained. We have, however, illustrated one practical means for controlling the headlight rays in the manner described, consisting in mounting the headlights on inclined axes so that when the headlights are in upright position they will be directed straight ahead in the ordinary manner and when tilted downwardly they will be simultaneously swung sidewise so as to be directed in paths diverging downwardly and outwardly with respect to the vehicle. Means operated by any suitable source of energy may be provided for tilting the headlights in this manner, and in the present instance, we have shown means actuated by a spring pressure for moving the headlights in one direction and by fluid pressure for tilting the lights in the opposite direction, all of which will be now more particularly described.

The headlights 6 may be of any suitable or preferred construction, and in the present instance, are merely illustrated in outline of a conventional design, the reflector or other means for intensifying the rays being not shown, as such construction is very well known in the art. Referring to Figs. 1 and 2 which illustrate only the headlight positioned at the right hand side of a vehicle as both headlights are of similar construction, it will be seen that the headlight is pivotally mounted on an inclined axis so that when tilted, its rays will be moved through a plane or path inclined with respect to the vertical. The shank 7 which carries the headlight, is adjustably mounted in a tubular bracket 8 which may be suitably secured to the vehicle, in this instance being rigidly attached to the right fender 9. The shank 7 may be adjusted vertically and rotatably in the bracket 8 as may often be desired when setting up the headlights and may be rigidly secured in such position by tightening the clamp bolt 11. The shank 7 is shaped to provide upwardly diverging arms 12 and 13, thereby forming the direct means upon which the same is pivotally mounted. Viewing Fig. 1, it will be noted that the arm 12 is considerably shorter than the arm 13 and that they respectively carry pivot bolts 14 and 15 arranged in axial alinement and connected to brackets 16 and 17 secured to the headlights. By reason of this mounting the headlight is adapted to oscillate on an inclined axis so that its rays may be moved from a straight-ahead to a downwardly and outwardly directed position described above. This tilting movement is limited in both directions by means which may be adjusted for the purpose of varying the range of such movement, the particular means illustrated being described in and constituting part of our copending application, Serial No. 128,594, filed Oct. 30, 1916. This means consists of a pin 18 fixed with respect to the arm 12 and located at one end in an arcuate slot 19 in the bracket 16 so that pivotal movement of the latter and consequently, of the headlight in opposite directions is limited by contact of the pin 18 against the opposite ends of the slot 19. Means is also provided for adjusting the pin 18 in an arcuate path relatively to the bracket arm 12 so as to vary the range of the tilting movement mentioned. For this purpose a supplemental adjusting plate 21 is provided, and in fact, carries the pin 18 which projects through an arcuate slot in the arm 12 similar to the slot 19. The plate 21 may be rotatably adjusted on the pivot pin 14 to change the position of the pin 18, and is adapted to be clamped to the arm 12 in any adjusted position by a nut 22 engaging a screw bolt 23 carried by the arm 12. It is believed it will be obvious that the adjustment of the plate 21 with respect to the arm 12 for the purpose of changing the position of the pin 18 will cause the range of pivotal movement of the headlight with respect to the horizontal to be changed.

An individual means operated from a common means of control is employed for tilting each headlight, and since the construction and operation of such individual means for both headlights are similar, a description of one will suffice. The headlight tilting means includes a cylinder 24 suitably mounted, preferably alongside of the standard 8 in the manner shown, a piston 25 located in the cylinder and equipped with a piston packing ring 26 to insure a tight joint, a universal link connection 27 between the end of the piston and the rear portion of the headlight in the manner shown, and an expansion spring 28 interposed between the piston head 25 and the upper end of the cylinder. The headlight is held in the position shown in Fig. 1, that is, in the straight-ahead position under the influence of the spring 28 and is adapted to be tilted downwardly and outwardly by fluid pressure, such as air. The air may be held under pressure in a suitable storage tank carried by the vehicle, the pressure being supplied either from a suitable pump or one of the cylinders of the engine, if desired, and a suitable valve control may be provided for admitting the air pressure to the cylinder for the purpose of raising or moving the piston against the pressure of the spring 28. An example of a suitable control means is somewhat diagrammatically illustrated in Fig. 1, from which it will be seen that the storage tank 29 is adapted to be supplied with air through the pipe 31 from one of the engine cylinders 32 by the action of the piston thereof. The compression from the cylinder may be admitted to the connection 31 at will through a suitable valve in the passage by actuating the control member 33 which may be operated from the dash of the vehicle. Suitable check valves such as 34, may be embodied in this connection to prevent back passage of air through the connection. A suitable pressure gage 35 and a relief valve 36 may also be provided to complete the system. Connection between the air under pressure and the cylinder 24 is established through a piping 37 in which connection is included a two-way valve 38 to which is fixed a handle or switch 39 for turning the valve. From Figs. 1 and 3, it will be noted that when the handle 29 is down, the port 41 in the valve connects the cylinder end of the piping 37 with a port 42 leading to the outer atmosphere so that and air in the cylinder is free to escape, thereby allowing the headlight to be tilted to its upright position under the influence of the spring 28. When the handle 39 is moved a quarter turn in a clockwise direction, its port 41 will connect the air under pressure with the cylinders 24 so that the air will raise the piston against the influence of the spring 28 and thereby tilt the headlight downwardly on its inclined axis as described above. As long as there is sufficient air pressure on the piston, the headlight will be held in downturned position and by turning the handle 39 to the position shown in full lines in the drawings, the air confined in the cylinder will be permitted to escape, allowing the spring to return the headlight to normal position. It will, of course, be understood that the cylinders of both headlights will be connected with the single pipe lead from the valve 38 so that the single valve controls the operation of both headlights.

In Figs. 5 and 6, we have illustrated diagrammatically one example of the manner in which the light rays are directed according to our improvements. It will be noted, viewing Fig. 5, that when the headlights are in the straight-ahead position the intensified rays designated by the heavy solid lines 43 converge slightly so that they will intersect a considerable distance in front of the vehicle and, as shown in Fig. 6, by the slightly downward inclination of these rays they will focus on the road bed approximately at their point of intersection. The diffused light rays surrounding the intensified rays and designated approximately by the lighter full lines 44 will, of course, illuminate the road bed to a certain extent, but the intensified rays are relied upon for bringing out the objects with such distinctness and clearness as to enable safe guidance. When it is desired to avoid the glary and dazzling effect of the rays in their straight-ahead position they will be directed downwardly at will by the operator manipulating the handle 39 in the manner described above, thereby causing the both headlights to be practically instantly tilted downwardly and outwardly or sidewise, producing the effect indicated in dotted lines in these diagrammatic figures. It will be noted that the intensified rays 43' are inclined downwardly and forwardly so as to strike the road bed comparatively close to the vehicle and that the rays have been further diverted or swung horizontally outwardly from the vehicle so as to intensely illuminate that portion of the road bed directly in front and at both sides of the vehicle, the diffused rays 44', of course, broadening this illumination and being more effective because they are more closely directed to the ground. It will be manifest that the light rays in this diverted position will very effectually illuminate the road bed immediately in front of the vehicle and for a considerable distance on both sides thereof so that there will be not the least difficulty in discerning the location and condition of the curbing or gutter along the side of the road bed. Another advantage of this illuminating effect is found when guiding or turning the vehicle either to the left or the right, as the rays are always projected laterally beyond and in advance of the vehicle to such an extent that there is not the slightest difficulty in quickly discerning objects or the condition of the cross way into which the driver is guiding the car. It will, of course, be understood that the relative angles shown in these diagrammatic figures are purely illustrative of the principles of our invention and that the same is in no way limited to such specific angles of inclination as these may be suitably varied within the scope of the invention by adjusting the position and range of tilting movement of the headlights. It should be further understood with regard to the broad idea of diverting the rays in the manner fully described above that any suitable mechanism either operated purely mechanically, electrically or by fluid or otherwise might be employed, and with regard to the particular example illustrated various changes in the construction and arrangement might be made without departing from the spirit and scope of the invention as expressed in the appended claims:

We claim:

1. Headlight illuminating means for vehicles comprising in combination, a pair of headlights adapted to be supported one at each side of the vehicle facing forwardly, supporting means carrying the headlights and constructed so that each headlight may be moved back and forth to different operative positions in one of which the intense rays of the headlight are directed substantially straight ahead and in the other downwardly and outwardly to the road bed in proximity to the vehicle, and operating means connected with both headlights and operable at will by an operator to simultaneously move both headlights back and forth to and from their downwardly and outwardly directed positions.

2. Headlight illuminating means for vehicles comprising in combination, a pair of headlights adapted to be supported one at each side of the vehicle facing forwardly, supporting means upon which the headlights are mounted to each oscillate about a downwardly and laterally inclined axis so as to be capable of oscillation in a direct movement from a substantially straight ahead to a downwardly and outwardly directed position, and operating means connected with both headlights and operable at will by an operator to oscillate both headlights about their respective axes to and from their downwardly and outwardly directed positions.

3. Illuminating means for the front of a vehicle comprising in combination an illuminating means at each side of the vehicle, means for causing the light rays of each illuminating means to be directed substantially straight ahead to illuminate the central portion of a road bed a substantial distance in advance of the vehicle and permitting the light rays to be withdrawn therefrom and directed downwardly and outwardly so as to illuminate the road bed immediately in front of the vehicle at the outer sides thereof, and operating mechanism constructed to cause the rays of both illuminating means to be projected either in said straight ahead position or said downwardly and outwardly directed position and operable at will by an operator to cause the rays of both illuminating means to be simultaneously projected in either of said directions.

4. Headlight illuminating means for vehicles, comprising a headlight mounted to oscillate about a downwardly and laterally inclined axis, spring actuating means connected to the headlight through the agency of a universal joint to swing the headlight in one direction, and power means rendered operative at will to swing the headlight in the opposite direction against the spring pressure of said actuating means.

5. Headlight illuminating means for vehicles, comprising a headlight so mounted at each side of a vehicle as to be movable from a substantial straight-ahead position to a downwardly and outwardly directed position, means constantly urging the headlights to one of said positions, and means rendered operative at will for simultaneously moving both headlights to the other position.

6. Headlight illuminating means for vehicles, comprising a headlight so mounted at each side of a vehicle as to be movable from a substantial straight-ahead position to a downwardly and outwardly directed position, means yieldingly holding the headlights in their straight-ahead position, and means operative from a single control member for simultaneously moving both headlights to a downwardly and outwardly directed position against the pressure of said yielding means.

7. headlight illuminating means for vehicles comprising a supporting standard provided with a pair of supporting arms, a headlight interposed between said arms, means pivotally securing the headlight to the arms on an axis inclined with respect to the vertical, and control means for oscillating the headlight about said axis to thereby move its rays through a path inclined with respect to the vertical.

8. A headlight illuminating means for motor vehicles comprising a headlight mounted to oscillate about an inclined axis, operating means having a member movable back and forth, and a universal connection between the headlight and said operating member.

9. A headlight illuminating means for motor vehicles comprising a headlight mounted to oscillate about an inclined axis, a cylinder and a piston therefor in juxtaposition to the headlight, a connection including a universal joint between the piston and the headlight, and operating means for controlling a fluid to actuate said piston and thereby move the headlight about said inclined axis.

10. A headlight illuminating means for motor vehicles comprising a headlight mounted to oscillate about an inclined axis, a cylinder and a piston therefor in juxtaposition to the headlight, a spring for moving the piston in one direction, a connection between the headlight and piston for swinging the former about its axis by movement of the piston, a fluid pressure supply, and a connection therefrom to the piston including a two-way valve movable in one direction for admitting said fluid under pressure to the cylinder and thereby moving the piston against the pressure of said spring and oscillating the headlight and movable in the opposite direction for allowing said fluid to escape from the cylinder whereupon the spring will return the headlight to normal position.

11. A headlight illuminating means for motor vehicles comprising a headlight mounted so as to be capable of moving downwardly and sidewise from a substantially straight ahead position, a cylinder and a piston therefor, a connection between the piston and headlight, and means for reciprocating the piston to thereby move the headlight to and from its said straight-ahead position.

SAMUEL S. GOSSARD.
JAY E. CRANDALL.